US012122057B2

(12) United States Patent
Xu et al.

(10) Patent No.: US 12,122,057 B2
(45) Date of Patent: Oct. 22, 2024

(54) ELECTRIC BEARD TRIMMER

(71) Applicant: Braun GmbH, Kronberg (DE)

(72) Inventors: Xiaolan Xu, Oberursel (DE); Roman Röder, Oberursel (DE); Andreas Peter, Kronberg (DE)

(73) Assignee: Braun GMBH, Kronberg (DE)

( * ) Notice: Subject to any disclaimer, the term of this patent is extended or adjusted under 35 U.S.C. 154(b) by 498 days.

(21) Appl. No.: 17/313,336

(22) Filed: May 6, 2021

(65) Prior Publication Data

US 2021/0347076 A1 Nov. 11, 2021

(30) Foreign Application Priority Data

May 8, 2020 (EP) .................................... 20173681

(51) Int. Cl.
*B26B 19/38* (2006.01)
*B26B 19/06* (2006.01)

(52) U.S. Cl.
CPC ........ *B26B 19/3846* (2013.01); *B26B 19/063* (2013.01)

(58) Field of Classification Search
None
See application file for complete search history.

(56) References Cited

U.S. PATENT DOCUMENTS 2,151,965 A 3/1939 Hanley
2,251,577 A 8/1941 Rand, Jr.
2,273,739 A 2/1942 Te
2,292,858 A 8/1942 Adalbert
2,948,063 A 8/1960 Ivar
3,060,574 A 10/1962 Thomas
3,093,899 A 6/1963 Bodo
3,279,056 A 10/1966 Mathew
(Continued)

FOREIGN PATENT DOCUMENTS

CH 353651 A 4/1961
CN 102452095 A 5/2012
(Continued)

OTHER PUBLICATIONS

English translation of CN 113910306 A, Jan. 2022.*
(Continued)

*Primary Examiner* — Hwei-Siu C Payer
(74) *Attorney, Agent, or Firm* — Kevin C. Johnson; Andrés E. Velarde

(57) ABSTRACT

The present invention relates to cutting body hair such as beard stubble. More particularly, the present invention relates to a cutter system for an electric shaver and/or trimmer, with a pair of cooperating cutting elements with at least one row of comb-like cutting teeth. The cutting elements are movably supported relative to each other by a support structure. At least one of the cutting elements, when viewed in cross section, has a C-shape including a pair of dog-eared holding flanges attached to the support structure and a slightly dome shaped or flat center section. The row of comb-like cutting teeth are formed in a transitional section between the dog-eared holding flanges and the center section. The dog-eared holding flange at the transitional section may be provided with a step-like concave depression forming thinned-out tooth tips.

16 Claims, 8 Drawing Sheets

(56) References Cited

U.S. PATENT DOCUMENTS

| | | | |
|---|---|---|---|
| 3,280,456 A | | 10/1966 | Erickson et al. |
| 4,133,103 A | | 1/1979 | Beck |
| 4,837,929 A | | 6/1989 | Tanahashi et al. |
| 5,979,060 A | | 11/1999 | Holzbauer et al. |
| 6,279,234 B1 | | 8/2001 | Chaouachi et al. |
| 6,505,404 B2 | | 1/2003 | Ullmann |
| 6,889,437 B2 | | 5/2005 | Bader |
| 7,730,621 B2 | | 6/2010 | Komori |
| 9,381,655 B2 | | 7/2016 | Lau |
| 9,381,656 B2 | | 7/2016 | Van Straaten et al. |
| 9,592,613 B2 | | 3/2017 | Pohl et al. |
| 9,718,200 B2 | | 8/2017 | Dryfhout |
| 10,391,647 B2 | | 8/2019 | Phoon et al. |
| 10,406,702 B2 | | 9/2019 | Vredeveld et al. |
| 10,647,010 B2 | | 5/2020 | Sablatschan |
| 10,682,777 B2 | | 6/2020 | Huisman et al. |
| 11,351,684 B2 | | 6/2022 | Phoon |
| 11,642,802 B2 | * | 5/2023 | Xu ........................ B26B 19/042 30/43.9 |
| 2005/0097757 A1 | | 5/2005 | Mccambridge et al. |
| 2006/0156555 A1 | | 7/2006 | Janny et al. |
| 2008/0134512 A1 | | 6/2008 | Putzer |
| 2011/0119929 A1 | | 5/2011 | Lau |
| 2014/0317932 A1 | | 10/2014 | Van Straaten et al. |
| 2015/0314461 A1 | | 11/2015 | Man Wong et al. |
| 2017/0028574 A1 | | 2/2017 | Taccarino et al. |
| 2017/0050326 A1 | | 2/2017 | Lau |
| 2017/0113361 A1 | | 4/2017 | Feijen et al. |
| 2017/0144319 A1 | | 5/2017 | Sablatschan |
| 2017/0190063 A1 | | 7/2017 | Schratter et al. |
| 2017/0361476 A1 | | 12/2017 | Phoon et al. |
| 2018/0009121 A1 | | 1/2018 | Stapelbroek et al. |
| 2018/0021965 A1 | | 1/2018 | Phoon et al. |
| 2018/0257248 A1 | | 9/2018 | Wu |
| 2018/0281213 A1 | | 10/2018 | Eijkelkamp et al. |
| 2021/0347069 A1 | | 11/2021 | Röder et al. |
| 2021/0347070 A1 | | 11/2021 | Röder et al. |
| 2021/0347071 A1 | | 11/2021 | Xu et al. |
| 2021/0347072 A1 | | 11/2021 | Xu et al. |
| 2021/0347076 A1 | * | 11/2021 | Xu ...................... B26B 19/3846 |
| 2022/0274271 A1 | | 9/2022 | Iaccarino |
| 2023/0150155 A1 | | 5/2023 | Wu |

FOREIGN PATENT DOCUMENTS

| | | | | |
|---|---|---|---|---|
| CN | 204339817 U | | 5/2015 |
| CN | 104999484 A | | 10/2015 |
| CN | 204894008 U | | 12/2015 |
| CN | 106346519 A | | 1/2017 |
| CN | 206287174 U | | 6/2017 |
| CN | 108724253 A | | 11/2018 |
| CN | 209190826 U | | 8/2019 |
| CN | 209478241 U | | 10/2019 |
| CN | 209682252 U | * | 11/2019 |
| CN | 113910306 A | * | 1/2022 |
| DE | 19939509 A1 | | 3/2001 |
| EP | 0707926 A1 | | 4/1996 |
| EP | 2875915 A1 | | 5/2015 |
| EP | 2875916 A1 | | 5/2015 |
| EP | 3388207 A1 | | 10/2018 |
| EP | 3461602 A1 | | 4/2019 |
| EP | 3466619 A1 | | 4/2019 |
| GB | 501137 A | | 2/1939 |
| GB | 719005 A | | 11/1954 |
| JP | S5568973 U | | 5/1980 |
| JP | H10323463 A | | 12/1998 |
| JP | 2017511230 A | | 4/2017 |
| KR | 20060125507 A | | 12/2006 |
| WO | 2015158923 A1 | | 10/2015 |
| WO | 2018189173 A1 | | 10/2018 |

OTHER PUBLICATIONS

English translation of CN-209682252-U, dated Nov. 26, 2019.*
All Office Actions; U.S. Appl. No. 17/313,273, filed May 6, 2021.
All Office Actions; U.S. Appl. No. 17/313,309, filed May 6, 2021.
All Office Actions; U.S. Appl. No. 17/313,396, filed May 6, 2021.
All Office Actions; U.S. Appl. No. 17/313,292, filed May 6, 2021.
CM05183FQ Extended EP Search Report and Written Opinion for 20173681.6 dated Dec. 2, 2020, 6 Pages.

* cited by examiner (a) (b)

ELECTRIC BEARD TRIMMER

FIELD OF THE INVENTION

The present invention relates to cutting body hair such as beard stubbles of multidays' beard. More particularly, the present invention relates to a cutter system for an electric shaver and/or trimmer, comprising a pair of cooperating cutting elements with at least one row of comb-like cutting teeth, wherein said cutting elements are movably supported relative to each other by a support structure, wherein at least one of said cutting elements, when viewed in cross section, has a C-shape including a pair of dog-eared holding flanges attached to said support structure and a slightly dome shaped or flat center section, said row of comb-like cutting teeth being formed in a transitional section between said dog-eared holding flanges and said center section.

BACKGROUND OF THE INVENTION

Electric shavers and trimmers utilize various mechanisms to provide hair cutting functionality. Some electric shavers include a perforated shear foil cooperating with an under-cutter movable relative thereto so as to cut hairs entering the perforations in the shear foil. Such shear foil type shavers are often used on a daily basis to provide for a clean shave wherein short beard stubbles are cut immediately at the skin surface.

On the other hand, other cutter systems including a pair of cooperating cutting elements with comb-like edges including one or more rows of comb-like or rake-like cutting teeth reciprocating or rotating relative to each other, are often used for cutting longer beard stubbles or problem hair that is difficult to cut due to, for example, a very small angle to the skin or growing from very resilient skin. The teeth of such comb-like or rake-like cutting elements usually project substantially parallel to each other or substantially radially, depending on the type of driving motion, and may cut hairs entering into the gaps between the cutting teeth, wherein cutting or shearing is achieved in a scissor-like way when the cutting teeth of the cooperating elements close the gap between the finger-like cutting teeth and pass over each other.

Such cutter systems for longer hairs may be integrated into electric shavers or trimmers which at the same time may be provided with the aforementioned shear foil cutters. For example, cutting elements may include two rows of comb-like cutting teeth arranged, for example, at opposite sides of the cutting elements and a field of shear foil-like cutting perforations between said rows of comb-like cutting teeth.

For example, EP 24 25 938 B1 shows a shaver with a pair of long hair trimmers integrated between shear foil cutters. Furthermore, EP 27 47 958 B1 and CN 206 287 174 U disclose hair trimmers having two rows of cooperating cutting teeth arranged at opposite sides of the shaver head, wherein the cutting teeth of the upper comb-like cutting element are provided with rounded and thickened tooth tips overhanging the tooth tips of the lower cutting element so as to prevent the projecting tooth tips from piercing into the skin and from irritating the skin. A similar cutter system is shown in US 2017/0050326 A1 wherein in such cutter system the lower comb-like cutting element is fixed and the upper comb-like cutting element is movable.

Shavers and/or trimmers combining rows of comb-like cutting teeth at opposite edges and shear foil-like cutting perforations between said rows of comb-like teeth sometimes include C-shaped outer cutting elements the edges of which are dog-eared to form limbs bent inwardly like the limbs of a C or a U, wherein such dog-eared limbs are held by a support frame. The transitional edge portion connecting the dog-eared limbs with the central portion of the outer cutting element is contoured or configured to form a row of comb-like teeth for cutting longer stubbles, whereas the central portion of the cutting element is provided with at least one field of perforations for cutting short hair. Said outer cutting element cooperates with an inner cutting element which may be plate-shaped and may include rows of comb-like teeth at opposite edges to cooperate with the comb-like teeth of the outer cutting element, and furthermore at least one field of perforations or other cutouts between the comb-like toothed edges for cooperating with the perforations in the outer cutting element.

Thus, shear foil like cutting perforations for cutting short hairs and comb-like cutting teeth for cutting longer hairs or stubbles may be integrated into the same cutting elements, wherein the inner cutting element may be biased against the outer cutting element usually by means of a spring device which may include a pair of flexible spring arms extending from a central base portion of the support structure towards the inner cutting element. Said spring arms may have a sort of V-shaped configuration and may contact the inner cutting element at sections between the central field of perforations and the opposite toothed edges. Due to such biasing of the inner cutting element against the outer cutting element, tugging and pulling hairs to be cut in the perforations can be avoided, but, on the other hand, the friction between the cutting elements is rather high what causes high energy consumption by the drive unit and furthermore heating of the cutting elements what is often felt unpleasing or uncomfortable. Such cutter systems are shown in documents CN 209 478 241 U and US 2018/0257248 A1.

A similar cutter system is disclosed by EP 31 31 716 B1, wherein the support structure includes an outer frame holding the outer cutting element at opposite edge portions thereof, wherein such outer frame includes, at its inner surface, a step-like projection forming a shoulder for supporting the inner cutting element at the toothed, comb-like edges. More particularly, said projecting shoulder at the inner surface of the outer support frame defines a gap extending from said shoulder to the outer cutting element, in which gap the inner cutting element is slidably received, wherein such gap provides for a vertical clearance which is adapted to the vertical thickness of the inner cutting element. Depending on the vertical clearance between the projecting shoulder and the outer cutting element, friction may be reduced, whereas the cutter system is prone to pulling and tugging hair to be cut by the cutting perforations since the inner cutting element may not be held close enough to the outer cutting element so hair to be cut may get stuck between the cutting perforations of the outer cutting element and the perforations or cutouts of the inner cutting element cooperating therewith.

Such beard stubble trimmers and shavers need to address quite different and diverging functional requirements and performance issues such as closeness, thoroughness, good visibility of the cutting location, efficiency and pleasant skin feel, good ergonomics and handling. Closeness means short or very short remaining stubbles, whereas thoroughness means less missed hairs particularly in problem areas like the neck. Efficiency means less and faster strokes suffice to achieve the desired trimming result. Pleasant skin feel depends on the individual user, but often includes less irritation in form of nicks, cuts or abrasion and better gliding onto the skin. Visibility of the cutting location is particularly important in case of styling or edging contours to accomplish hair removal with local accuracy.

Fulfilling such various performance issues at the same time is quite difficult. Meeting such needs becomes even more difficult when different types of cutting contours such as shear foil-like perforations and comb-like rows of teeth are integrated into the same cutting elements such as c-shaped cutting blades reciprocating relative to each other since such multiple-function cutter elements may not be adapted exclusively to one specific cutting function.

More particularly, it is difficult for such C-shaped cutter elements to achieve sufficient thoroughness and closeness since the comb-like cutting teeth formed in the transitional region between the dog-eared holding flanges and the dome-shaped center section tend to miss short stubbles or hairs extending parallel to the skin. Due to the dog-eared holding flange and the curved contour of the tooth tips, such short stubbles and lying hairs may not get hooked onto the teeth and thus, may not properly enter into the interstices between the teeth.

SUMMARY OF THE INVENTION

It is an objective underlying the present invention to provide for an improved cutter system avoiding at least one of the disadvantages of the prior art and/or further developing the existing solutions. A more particular objective underlying the invention is to provide for a close and thorough cutting of hair and longer stubbles including a good control of edging contours and, at the same time, avoiding skin irritations. Another objective underlying the present invention is a reliable and clean cutting action of the cooperating cutting teeth and cutting perforations to avoid pulling and tugging of hair.

According to an aspect, closeness and thoroughness of the cutting action may be combined with a pleasant skin feel avoiding skin irritations, by means of a C-shaped cutting element the dog-eared holding flanges of which have a step-like contour making the comb-like teeth thinner so as to enhance threading of hairs and stubbles into the interstices between the teeth, but still allowing stable mounting and holding of the dog-eared flanges at the support structure.

More particularly, said dog-eared holding flange at said transitional region where the comb-like cutting teeth are formed, may be provided with a step-like concave depression forming thinned-out tooth tips of said comb-like cutting teeth. Due to such step-like concave depression, the cutting teeth—considering it's overall thickness from the outer skin side to the outer opposite side on the far side relative to the skin side—become sufficiently thin to get even short stubbles and hair lying parallel onto the skin hooked onto the teeth and engaged with the cutting edges of the teeth, whereas on the other hand the dog-eared holding flange, with a portion further away from the tooth tips, provides for sufficient distance from the center section of the C-shaped cutter element to be able to accommodate other elements or portions of the cutter system such as frame portions holding the dog-eared flanges.

Said step-like, concave depression may face away from a skin contacting/facing surface formed by the center section of the c-shaped cutting element so, despite such step-like, depressed contour of the dog-eared holding flanges, the C-shaped cutting element may have a continuously convex or dome-shaped or flat frontside defining said skin contact surface and/or skin facing surface allowing for continuous skin engagement of other hair cutting structures such as shearfoil-like perforations which may be arranged in said center section of the C-shaped cutter element.

These and other advantages become more apparent from the following description giving reference to the drawings and possible examples.

DETAILED DESCRIPTION OF THE INVENTION

Figure 1:
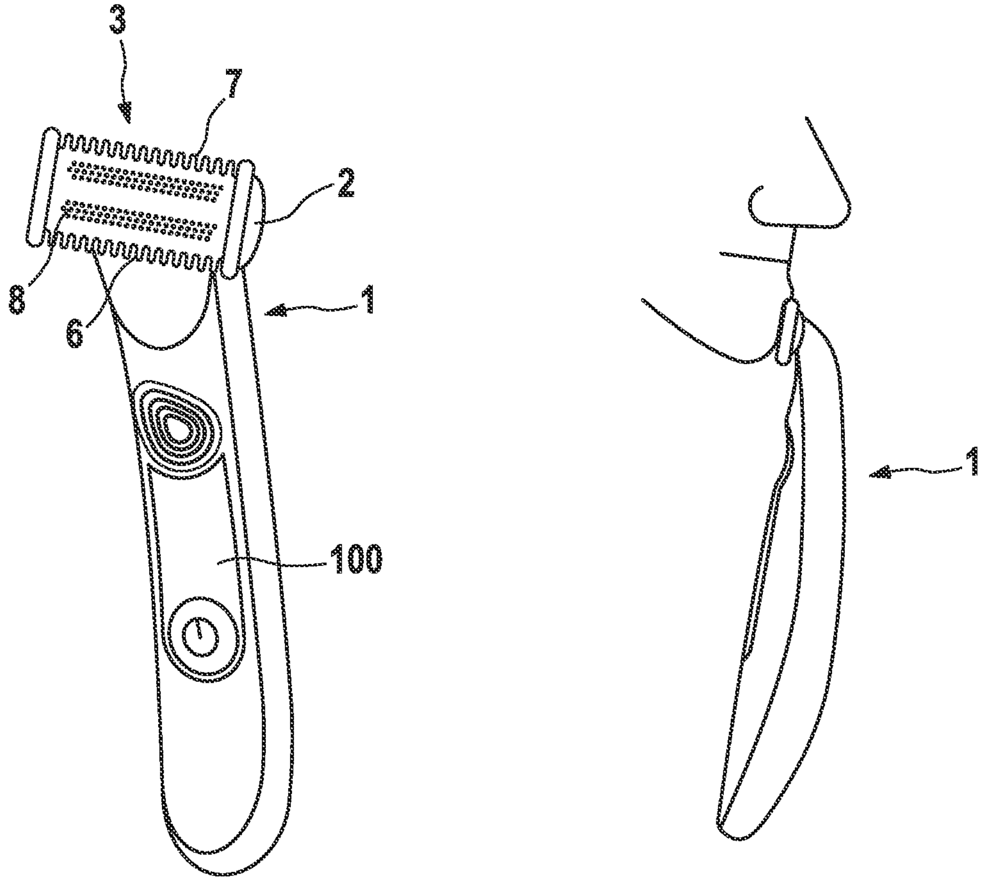
FIG. 1: perspective views of an electric beard trimmer/shaver including a cutting system with a pair of cooperating comb-like cutting elements reciprocating relative to each other, wherein partial view (a) shows a front side of the electric beard trimmer and partial view (b) shows the beard trimmer working on a chin.

So as to achieve closeness and thoroughness of the cutting action and, at the same time, a pleasant skin feel avoiding skin irritations, the dog-eared holding flanges of the C-shaped cutting element may have a step-like contour making the comb-like teeth thinner so as to enhance picking-up and threading hairs and stubbles into the interstices between the teeth, but still allowing stable mounting and holding of the dog-eared flanges at the support structure. At the same time, such step-like contour helps in making the rake-like edge of the cutting element rigid and stiff what prevents the teeth from undesired deflection and enhances the cutting action.

More particularly, said dog-eared holding flange at said transitional region where said at least one row of comb-like cutting teeth is formed, may be provided with a step-like concave depression forming thinned-out tooth tips of said comb-like cutting teeth. Due to such step-like concave depression, the cutting teeth become sufficiently thin to go under hair lying parallel onto the skin and to get even short stubbles hooked and engaged with the cutting edges of the teeth, whereas on the other hand the dog-eared holding flange, with a portion further away from the tooth tips, provides for sufficient distance from the center section of the C-shaped cutter element to be able to accommodate other elements or portions of the cutter system such as frame portions holding the dog-eared flanges.

Despite such step-like, depressed contour of the dog-eared holding flanges, the C-shaped cutting element may have a continuously convex or dome-shaped or flat frontside defining a skin contact surface and/or skin facing surface allowing for continuous skin engagement of other hair cutting structures such as shearfoil-like perforations which may be arranged in said center section of the C-shaped cutter element.

More particularly, said front side of the center section of the C-shaped cutting element defining the skin contacting/facing surface may extend continuously dome-shaped or continuously flat to the tooth tips of said comb-like cutting teeth.

When viewing the aforementioned C-shaped cutter element in cross section, the thinned out tooth tips, due to such concave depression, may be formed substantially U-shaped and/or may include neighboring portions of said holding flange and said center section which are folded back-to-back onto each other to form, in cross section of the C-shaped cutter element, U-shaped tooth tips.

The aforementioned transitional region between the dog-eared holding flange and the dome-shaped or flat center section of the cutting element, may be curved by at least 165° or 175° in cross section. More particularly, at the tooth tips and/or at the teeth, the dog-eared holding flange may be pressed onto the backside of the center section so that the material forming the C-shaped cutting element is sort of doubled in the region of the teeth. Consequently, the thickness of the teeth becomes very small and does not significantly exceed an amount of twice the material thickness.

When viewing the cutting element in cross section, said step-like concave depression of the dog-eared holding flange at the comb-like teeth may be arranged between two inflection points where, when viewed in cross section, the concave contour of the depression turns into convex and/or flat contours neighboring said concave depression. On the one side, the tooth tips may form a convex contour in terms of a curved portion with a very small radius of curvature or a tip portion defining a sort of protruding peak. On the other side, i.e. the end of the concave depression opposite to the tooth tips, the concave contour may turn into a slightly convex or flat flange portion.

Considering a virtual tangential line onto the dog-eared flange of the C-shaped cutting element, said tangential line may contact the tooth tip on the one hand and said slightly convex or flattened portion of the dog-eared holding flange on the other hand, wherein between said two contact points of the imaginative tangential line the aforementioned concave depression may form a gap to said tangential line. In other words, the transitional section between the tooth tips and the end portion of the dog-eared holding flange may include some slack and/or a dint and/or a flattening on the backside of the C-shaped cutting element. Said backside of the C-shaped cutting element is facing away from the center section of the C-shaped cutting element defining the skin contact surface or skin facing surface of the C-shaped cutting element.

The aforementioned step-like concave depression may be smoothly curved in cross-section and/or may define a shallow chute-shape or trough-shape along the backside of the rake-like edge of the C-shaped cutting element.

Irrespective of such curved contour of the depression, the aforementioned step-like concave depression may be provided between frame portions of the support structure holding the dog-eared holding flanges on the one hand and the tips of the comb-like cutting teeth on the other hand, and/or may be immediately adjacent to the tooth tips of the comb-like cutting teeth. In other words, the holding flanges of the support structure may end on the dog-eared holding flanges before reaching the concave depression thereof.

Such arrangement of the concave depression between the holding flanges of the support structure and the tooth tips allows to combine thinned-out cutting teeth with sufficient space for the support structure.

The thickness of the comb-like cutting teeth (so those which are stationary and not motor driven), when viewed in a cross section of the C-shaped cutting element, may be less than 300% or less than 250% of the thickness of the material forming the center section and/or dog-eared flange of the cutting element. For example, when the C-shaped cutting element is made from a sheet-like material having a sheet thickness of 0.15 mm, the teeth may have a thickness h of less than 1.5 mm, or less than 1 mm or less than 0.5 mm and/or ranging from 0.3 mm to 0.5 mm or 0.35 mm to 0.45 mm. This thickness is measured at 0.3 mm, so from a point at the outermost tooth tip surface inwardly at 0.3 mm in a direction towards the opposite row of comb like cutting teeth.

When viewed in cross section, said tooth tips of the comb-like cutting teeth may have a radius of curvature of less than 0.25 mm.

For example, the C-shaped cutting element may be formed from a metal sheet, in particular from a spring steel sheet, wherein a spring steel having a tensile strength of more than 500 $N/mm^2$ or more than 750 $N/mm^2$ may be used.

In addition to said at least one row of comb-like cutting teeth, the C-shaped cutting element may include at least one field of perforations provided in said slightly dome-shaped or flattened center section, wherein such perforations may cut short stubbles or very short hairs entering into the perforations in a shear-foil-like way.

Such cutting perforations for cutting short hair may be restricted to areas of the skin contact surface or skin facing surface of the cutting elements following the comb-like cutting teeth when the cutter system is moved along the skin to be shaved with one of the rows of comb-like teeth moving ahead, whereas a middle portion of the skin contact/facing surface defined by the cutting elements in-between said opposite rows of comb-like teeth is unperforated.

Such arrangement of restricted areas of perforations separated from each other takes into account that very short hair is cut by the perforations immediately following the comb-like teeth or position close to said comb-like teeth when the cutter system is moved along the skin to be shaved in a usual manner, i.e. with one of the comb-like cutting edges moving ahead, whereas the perforations further away from the leading comb-like cutting edge are less effective in cutting very short hairs. Due to the elimination of perforations in areas of the skin contact surface less effective in cutting very short hairs reduces the friction between the cutting elements without sacrificing efficiency in cutting very short hairs. Friction is reduced as less cutting edges of less perforations need to pass each other when the cutting elements move relative to each other and, thus, hair particles already cut or hair dust coming from the cutting perforations moving ahead over the skin to be shaved is not cut or grinded once again so frictional losses are reduced.

More particularly, the cutting perforations may be arranged in two separated elongated fields of perforations which are separated from each other by an elongated unperforated center section of an outer one of said cutting elements defining a skin contact surface, and which include each at least two rows of perforations extending along the rows of comb-like cutting teeth.

So as to allow for sufficient support of the cutting elements moving relative to each other without interfering with the cutting action of the comb-like teeth and perforations, said fields of perforations also may be separated from or spaced apart from the rows of comb-like teeth by elongated, unperforated side sections of said outer cutting element, wherein the support structure may include a pair of flexible or rigid support ribs supporting an inner one of said cutting elements under said unperforated side sections adjacent to or along outer boundaries of said fields of perforations. More particularly, such rigid or flexible support ribs may extend from a central base portion of the support structure and may have a support edge extending under said other cutting element in a region between said elongated, unperforated side sections of the outer cutting element and said concave depression of the dog-eared holding flange of said C-shaped cutting element.

So as to keep the inner and outer cutting elements snugly fitting onto each other in the region where the cutting perforations are formed, it may be helpful when the rigid or flexible support ribs, with their support edge, extend directly adjacent to or closely neighboring an outer boundary of the field of perforations. The support ribs, with their support edges, may contact the inner cutting element immediately along the outermost rows of perforations.

In the alternative, said support edge of the support ribs may contact the inner cutting element along a line spaced apart from the outermost rows of perforations. Nevertheless, the support edges of the support ribs may be positioned closer to the outermost rows of perforations then to the cutting teeth at the opposite edges of the cutting elements. More particularly, the distance of the support edges of the support ribs from the field of perforations may be less than ⅓ or less than ¼ of the distance of the support edges from the comb-like cutting teeth.

So as to take up the skin contact pressure induced in the inner cutting element via the outer cutting element in a balanced way, the support edges of the support ribs facing the inner cutting element may be spaced from each other at a distance ranging from 35% to 70% or 40% to 60% of the distance defined between the rows of comb-like teeth at the opposite edges of the cutting elements. Depending on the user's preference, different portions of the skin contact surface defined by the outer cutting element may be pressed against the skin with varying forces so that varying skin pressure may arise. So as to balance such varying pressures, it is helpful when the inner cutting element is supported by said support ribs at about ⅓ and about ⅔ of the span width of the inner cutting element when considering a cross sectional view thereof.

Said support ribs and/or their supporting edges contacting the inner cutting element may extend parallel to the axis of reciprocation and/or parallel to the rows of comb-like teeth at the opposite edges of the cutting elements.

The support ribs may be anchored at the base portion of the support structure in different ways. For example, the support ribs may be welded to said base portion or embedded in the material of said base portion. For example, when there are separate support ribs, each of the ribs may be inserted into a slot-like recess in said base portion to hold the support ribs in the desired orientation and position.

In the alternative, the support ribs inclined to each other at an acute angle, may be connected to each other in one piece and/or form integral parts of a support rib element. More particularly, the support ribs may be formed by V-like limbs of a support frame insert that can be inserted into the support structure supporting the cutting elements and/or attached to the base portion of such support structure. Such support rib insert may have a chute-like or trough-like configuration including a strip-like bottom portion from which the two support ribs extend at the described inclination. Such chute-like insert can be inserted into the support structure and fixedly attached to the base portion thereof. For example, the bottom portion of the insert may be seated onto the inner surface of a bottom portion of the outer support frame at a center portion thereof, wherein the central bottom portion of the outer support frame may form a seat for the support rib insert.

Seating the support rib insert onto the bottom portion of the outer support frame may take up the support forces and pressure induced into the support ribs, thereby pressing the support rib insert onto the bottom portion of the outer support frame.

Said inner support frame insert may be fixedly attached to the outer support frame, e.g. glued and/or welded and/or form-fitted thereto.

The sandwiched cutting element may be driven by a driver which is connected to the inner cutting element and coupled to a drive train transmitting a driving action of a drive unit, wherein the aforementioned inner support frame including the rigid support ribs and the outer support frame including the outer frame portions holding the outer cutting element and the base portion backing the inner support frame, may include one or more central, elongated or slit-like throughholes in which a portion of said driver and/or said drive train is slidably received. In other words, the driver and/or drive train extends through said throughhole in the inner and outer support frames and is slidably received therein to allow for reciprocating of the driver and thus, the sandwiched cutting element relative to the other cutting element.

The driver may include an elongated rod-like portion attached to opposite end portions of the inner cutting element and accommodated in the inner sub-chamber defined between the rigid support ribs and the inner cutting element.

The sandwiched cutting element may be the driven cutting element which may reciprocate or rotate, depending of the type of drive.

Basically, each of the cooperating cutting elements may be driven. However, to combine an easy drive system with safe and soft cutting action, the upper or outer cutting element having the skin contact surface may be standing and/or may be not reciprocating and not rotating, whereas the lower or inner cutting element which may be the sandwiched cutting element, may reciprocate or rotatorily oscillate.

As can be seen from figures land 2, the cutter system 3 may be part of a cutter head 2 which may be attached to a handle 100 of a shaver and/or trimmer 1. More particularly, the shaver and/or trimmer 1 may include an elongated handle 100 accommodating the battery 104, the electronic and/or electric components such as a control unit 111, an electric drive motor 103 or a magnetic drive motor and a drive train 109 for transmitting the driving action of the motor to the cutter system at the cutter head 2 which cutter head 2 may be positioned at one end of the elongated handle 100, cf. FIG. 1/2.

The cutter system 3 including a pair of cooperating cutting elements 4 and 5 may be the only cutter system of the cutter head 2 as it is the case with the example shown in FIG. 1. On the other hand, the cutter system 3 may be incorporated into a shaver head 2 having other cutter systems such as shear foil cutters, wherein, for example, the cutter system 3 having at least one row of cooperating cutting teeth 6, 7 may be positioned between a pair of shear foil cutters, or, in the alternative, may be positioned in front of such a shear foil cutter.

As shown by FIG. 1, the cutter system 3 may include elongated rows of cutting teeth 6 and 7 which may reciprocate relative to each other along a linear path so as to effect the cutting action by closing the gaps between the teeth and passing over each other. On the other hand, the cutter system 3 also may include cutting teeth 6 and 7 which are aligned along a circle and/or are arranged radially. Such rotatory cutting elements 4 and 5 may have cutting teeth 6 and 7 projecting substantially radially, wherein the cutting elements 4 and 5 may be driven to rotate relative to each other and/or to rotatorily oscillate relative to each other. The cutting action is basically similar to reciprocating cutting elements as the radially extending teeth, when rotating and/or rotatorily oscillating, cyclically close and reopen the gap between neighboring teeth and pass over each other like a scissor.

Figure 2:
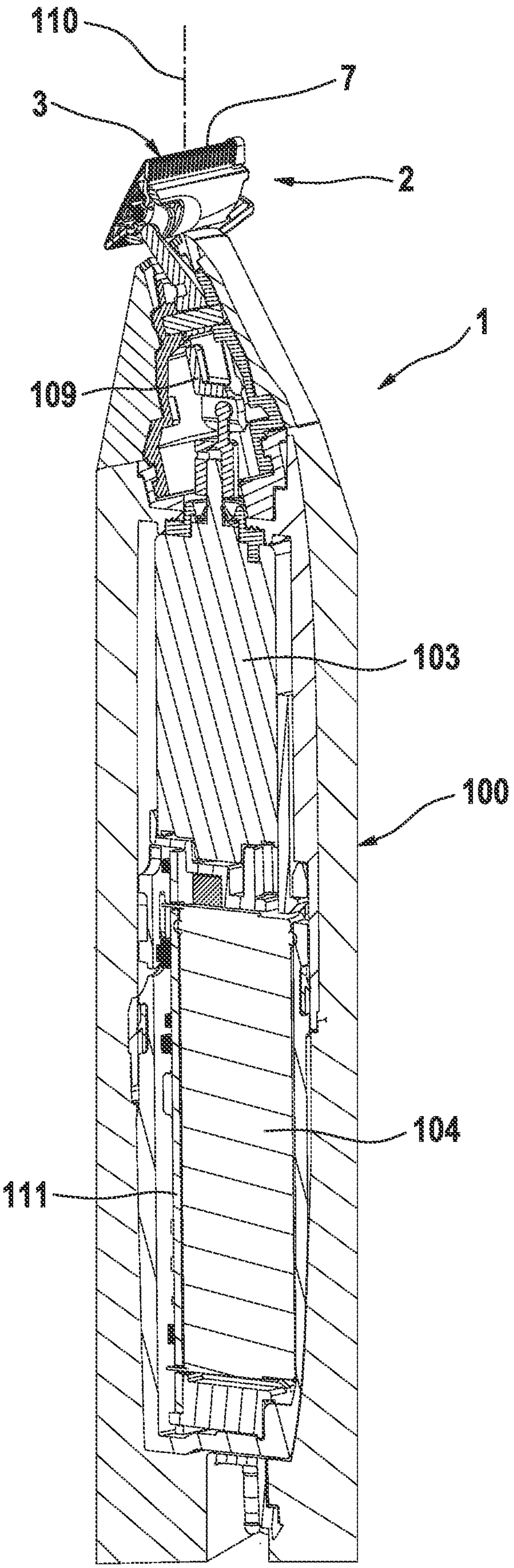
FIG. 2: a cross sectional view of the beard trimmer/shaver showing the cooperating comb-like cutting elements and the drive system for driving said cutting elements.

As shown by FIG. 2, the drive system may include a motor the shaft of which may rotate an eccentric drive pin which is received between the channel-like contours of a driver 18 which is connected to one of the cutting elements 4 which is caused to reciprocate due to the engagement of the rotating eccentric drive pin with the contours of said driver 18.

Figure 3:
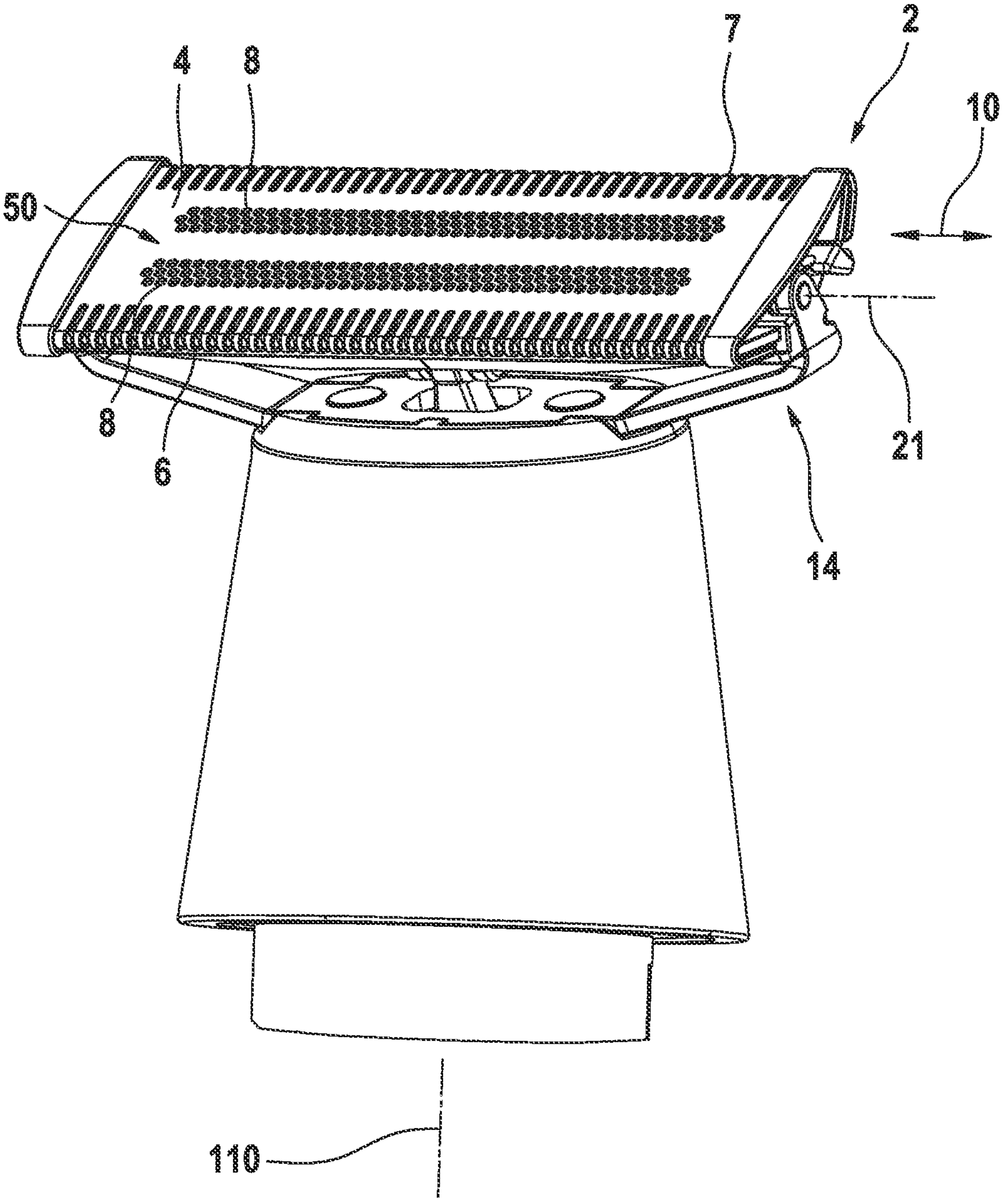
FIG. 3: a perspective view of the cutter system including the pair of cooperating comb-like cutting elements and the support structure for supporting the cutting elements relative to each other, FIG. **4*a*-4*b*: cross sectional views of the cutter system and the support structure, wherein the C-shaped outer cutting element is shown to be bent or curved around outer frame portions and an inner cutting element is shown to be supported by a V-shaped inner support frame having support ribs extending from a base portion of the support structure at a steeper angle then said outer frame portions, wherein partial view (a) shows rigid support ribs whereas view (b) shows flexible, spring-like support ribs.
Figure 4A:
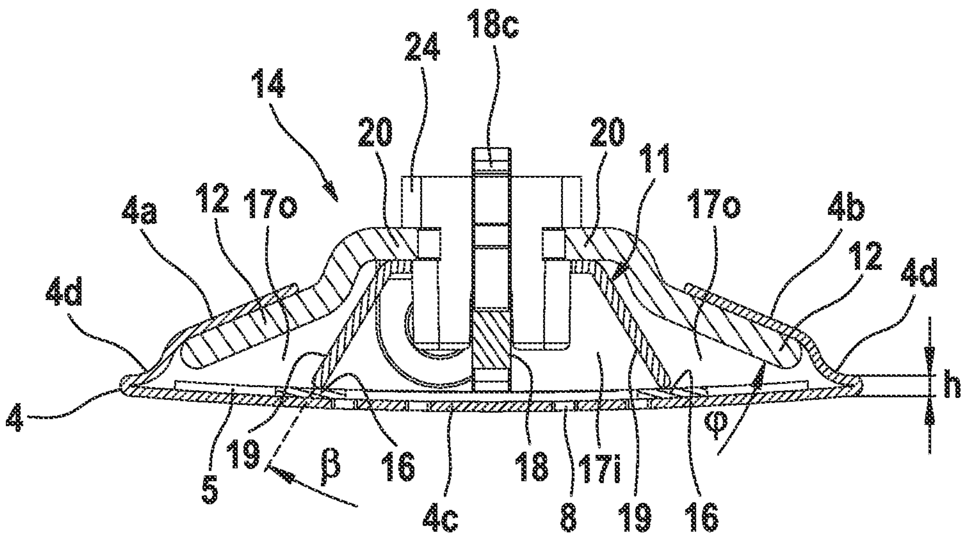
Figure 4B:
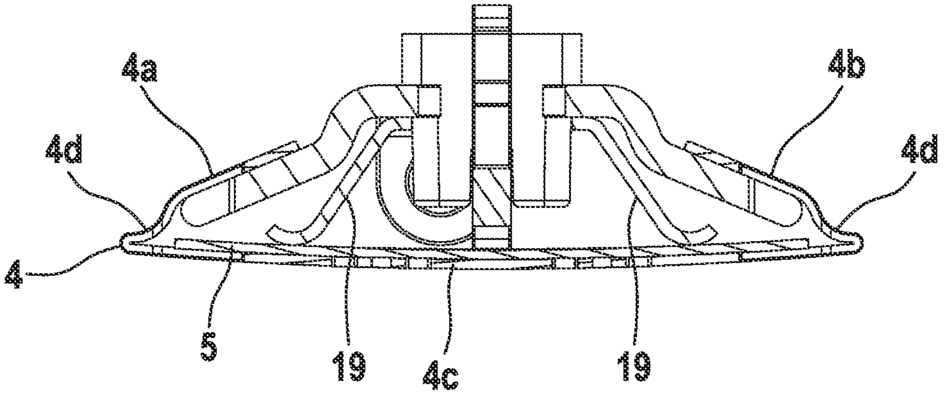
Figure 5:
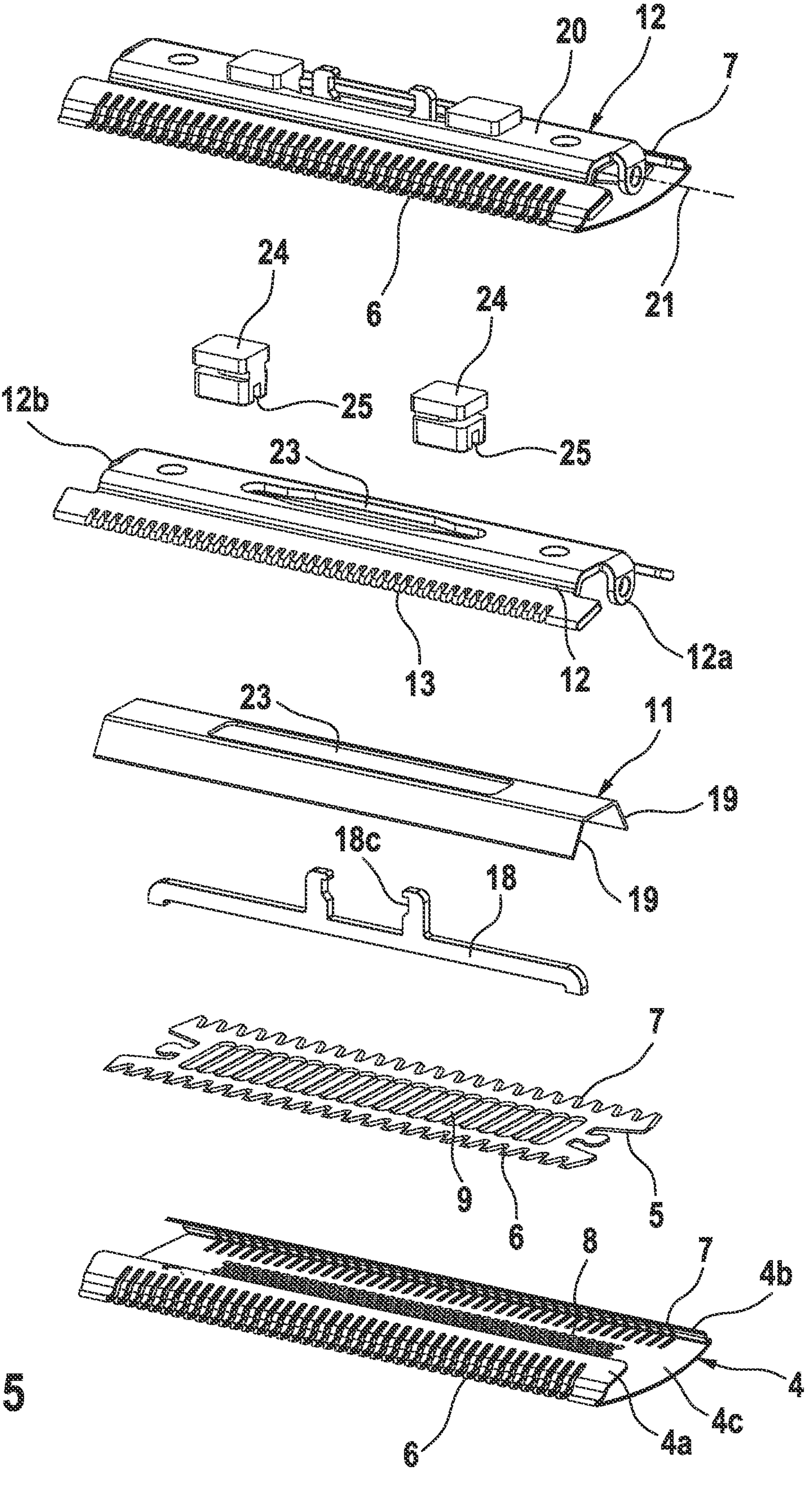
FIG. 5: an exploded perspective view of the elements of the cutter system including the outer and inner cutting elements, an outer support frame for holding the outer cutting element, a chute-shaped or trough-shaped inner support frame including rigid support ribs for supporting the inner cutting element, a driving element for reciprocating the inner cutting element and guide blocks for guiding the reciprocating driving element.

As shown by FIGS. 3, 4 and 5, the cooperating cutting elements 4 and 5 basically may have—at least roughly—a plate-shaped configuration, wherein each cutting element 4 and 5 includes two rows of cutting teeth 6 and 7 which may be arranged at opposite longitudinal sides of the plate-like cutting elements 4 and 5, cf. FIG. 4 and FIG. 5. The cutting elements 4 and 5 are supported and positioned with their flat sides lying onto one another. More particularly, the cutting teeth 6 and 7 of the cutting elements 4 and 5 touch each other back to back like the blades of a scissor.

In addition to such comb-like cutting teeth 6 and 7, the cooperating cutting elements 4 and 5 may be provided with at least two fields of cutting perforations arranged between the rows of cutting teeth 6 and 7 in a middle portion of the cutting elements 4 and 5. More particularly, each field of cutting perforations 8 of the outer cutting element 4 defining a skin contact surface of the cutter system 3 may include at least two rows of perforations 8 which may be formed as small sized throughholes having a circular, oval, elliptical or polygonal shape.

In particular, such small sized throughholes forming the perforations 8 may have a hexagonal shape, wherein the long axis of such hexagonal throughholes, i.e. the axis going through opposite corners of the hexagonal shape, may be oriented transverse to the reciprocating axis 10 of the cutting elements 4 and 5.

Figure 9:
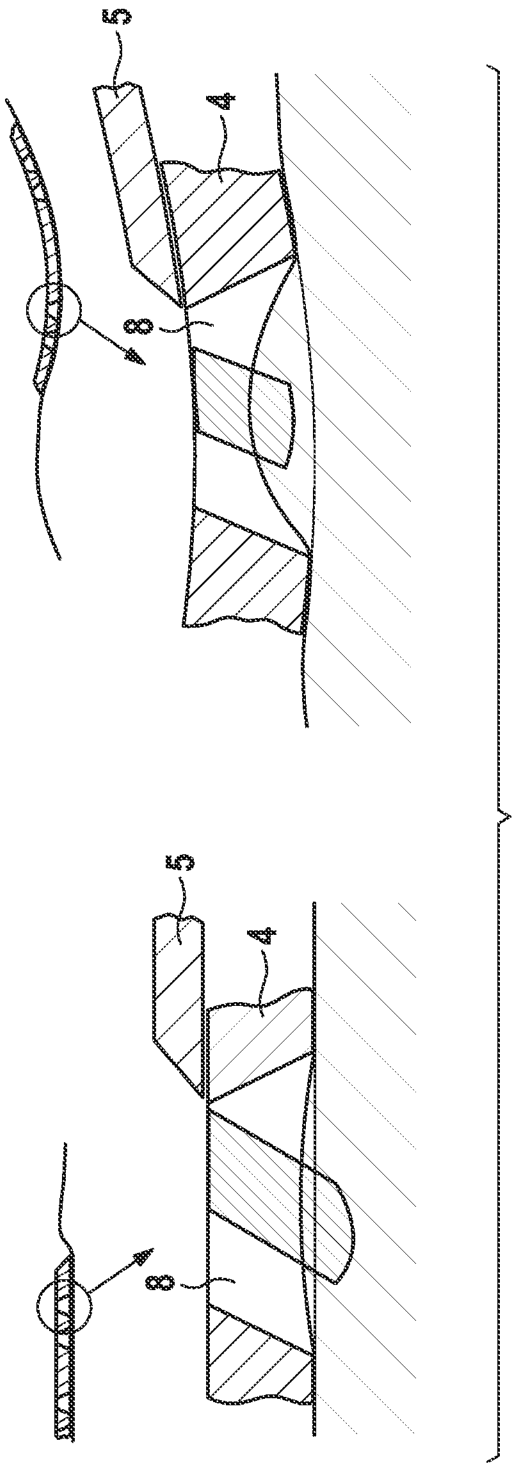
FIG. 9**: a cross sectional view of perforations having a conical or non-cylindrical contour expanding towards the skin contact surface for helping hair entering the perforation.

As can be seen from FIG. 9, the perforations 8 may expand towards the skin contact/facing surface, i.e. the cross sectional area of the perforation 8 becomes larger towards the skin contact surface. Such trumpet-like or conical or truncated pyramid-like shape helps hair to enter the perforations, as can be seen from FIG. 9.

Figure 8:
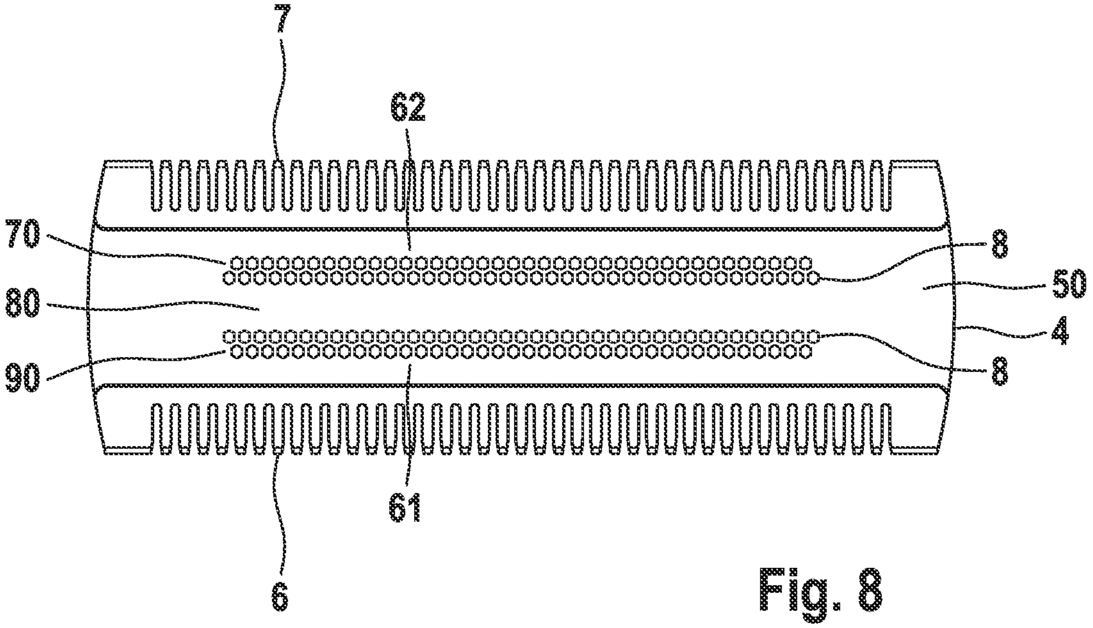
FIG. 8: a plain view of the outer cutting element showing the separate fields of perforations thereof.

As can be seen from FIG. 8, the perforations 8 are not distributed all over the center section of the skin contact surface, but are arranged in limited areas only. More particularly, the cutting perforations 8 for cutting short hair are restricted to areas 70, 90 of the skin contact surface or skin facing surface 50 of the cutting element 4 following the comb-like cutting teeth 6, 7 when the cutter system 3 is moved along the skin to be shaved with one of the rows of comb-like teeth 6, 7 moving ahead, whereas a middle portion 80 of the skin contact/facing surface defined by the cutting elements in-between said opposite rows of comb-like teeth is unperforated.

Such arrangement of restricted areas 70, 90 of perforations 8 spaced apart from each other takes into account that very short hair is cut by the perforations 8 immediately following the leading one of the rake-like cutting edges, whereas the perforations further away from the leading comb-like cutting edge are less effective in cutting very short hairs. Due to the elimination of perforations in areas of the skin contact surface 50 less effective in cutting very short hairs reduces the friction between the cutting elements 4, 5 without sacrificing efficiency in cutting very short hairs. Friction is reduced as less cutting edges of less perforations need to pass each other when the cutting elements move relative to each other and, thus, hair particles already cut or hair dust coming from the cutting perforations moving ahead over the skin to be shaved is not cut or grinded once again so frictional losses are reduced.

More particularly, the cutting perforations 8 may be arranged in two separated elongated fields 70, 90 of perforations which are separated from each other by an elongated unperforated center section 80 of an outer one of said cutting elements 4 defining a skin contact surface 50, and which include each at least two rows of perforations 8 extending along and/or parallel to the rows of comb-like cutting teeth 6, 7.

So as to allow for sufficient support of the cutting elements moving relative to each other without interfering with the cutting action of the comb-like teeth 6, 7 and perforations 8, said fields of perforations 70, 90 also may be separated from or spaced apart from the rows of comb-like teeth 6, 7 by elongated, unperforated side sections 61, 62 of said outer cutting element, wherein the support structure may include a pair of flexible or rigid support ribs 19 supporting an inner one of said cutting elements 5 under said unperforated side sections 61, 62 adjacent to or along outer boundaries of said fields of perforations 70, 90.

So as to reduce friction due to engagement of the support structure 14 with the moving cutting element 5, the inner cutting element 5 may extend unsupported under said unperforated center section 80 between said fields 70, 90 of perforations 8.

Said elongated unperforated center section 80 of the skin contact surface 50 defined by the outer cutting element may have a size or width which is larger than a size or width of each of said fields 70, 90 of perforations. More particularly, the unperforated center section of the skin contact surface may extend over an area ranging from 100%-250% or from 110% to 175% of the area defined by each of said fields of perforations, cf. FIG. 8.

More generally, more than ⅔ or more than ¾ of the area of the skin contact surface 50 of the cutter element 4 between the comb-like cutting teeth may be unperforated. In other words, only ¼-⅔ of the skin contact surface 50 between the opposite rake-like toothed edges of the cutter system 3 may be perforated, as it is shown by FIG. 8. Such limitation of the area of perforations 8 may significantly reduce the friction when the cutting elements 4, 5 move relative to each other.

Such perforations 8 in the outer cutter element 4 may cooperate with perforations 9 in the inner cutting element 5 when said cutting elements 4 and 5 reciprocate relative to each other along the axis of reciprocating 10. Said perforations 9 in the inner cutting element 5 also may be formed as small sized throughholes of a shape corresponding to or differing from the shape of the perforations 8 in the outer cutting element 4. However, as can be seen from FIG. 5, the perforations 9 in the inner cutting element 5 do not need to be small sized throughholes, but may be larger sized cutouts each cooperating with more than one perforations 8 in the other cutting element 4. More particularly, the perforations 9 in the inner cutting element 5 may be formed as longitudinal, slot-like cutouts extending, with their longitudinal axis, transverse to the axis of reciprocation 10. Thus, each elongated transverse perforation 9 in the inner cutting element 5 may cooperate with each row of perforations in the outer cutting element 4.

Said cutouts in the inner cutting element 5 overlap with the perforations 8 in the outer cutting element 4 and, depending on the reciprocating action, close said perforations 8 to effect a shearing action and/or cutting-off of hairs introduced into the perforations 8 and 9.

As can be seen from FIG. 3 and FIG. 8, said rows of perforations 8 may substantially extend parallel to the rows of comb-like cutting teeth 6 and 7 in a portion of the cutting elements 4 and 5 between said rows of comb-like cutting teeth 6 and 7.

So as to support the cutting elements 4 and 5 in the aforementioned position lying and/or seated onto each other back-to-back, but still allowing reciprocating movement of the cutting teeth 6 and 7 and the perforations 8 and 9 relative to each other, the inner cutting element 5 is sandwiched between the outer cutting element 4 and a support structure 14 which includes an inner frame supporting the inner cutting element 5 and an outer frame 12 holding the outer cutting element 4, cf. FIG. 4.

More particularly, said support structure 14 defines a gap 16 in which the inner cutting element 5 may move relative to the outer cutting element 4, wherein the inner cutting element 5 is slidably guided in said gap 16.

More particularly, as can be seen from FIGS. 4 and 5, the outer cutting element 4, when viewed in a cross section, may have a substantially C-shaped configuration with dog-eared edge portions **4*a* and 4*b* which are bent away or curved away from the skin contact surface and form holding flanges attached to or fixed to said outer frame portions 12 of the support structure 14. Said edge portions 4*a* and 4*b* may be folded back or bent around the edge portions of said outer frame 12, as it can be seen from FIG. 4. However, in the alternative, it also would be possible to seat said holding flanges 4*a* and 4*b* of the cutting element 4 onto the inner side of said outer frame 12**.

The cutting element 4 may be rigidly or fixedly fastened to said outer frame portions 12. For example, the cutting element 4 may be welded or glued to the outer frame 12.

As can be seen from FIGS. 4 and 5, said outer frame portions 12 of the support structure 14 may include a pair of diverging legs forming a shallow chute or trough, wherein the edge portions of said support legs of the outer frame 12 may be provided with slot-like cutouts 13 forming a toothed edge basically corresponding to the cutting teeth 6 and 7 of the cutting elements 4 and 5. More particularly, said cutouts 13 in the edges of the outer frame 12 allow hair to be cut to enter into the teeth 6 and 7 of the cutting elements 4 and 5, but at the same time provide for support to the cutting teeth 6 of the outer cutting element 4 to some extent.

The cutting teeth 6 of the outer cutting element 4 may be formed in the transitional region between the folded back support flanges **4*a* and 4*b* and the front side of the cutting element 4 defining the skin contact surface of the cutter system 3**.

Said outer cutting element 4 may form a C-shaped, plate-like cutting element the edges of which are dog-eared to form limbs bent inwardly like the limbs of a C or a U, wherein such dog-eared limbs **4*a* and 4*b* are held by said outer support frame portions 12. The transitional edge portion connecting the dog-eared limbs with the central portion of the outer cutting element is contoured or configured to form a row of comb-like teeth 6 for cutting longer stubbles, whereas the central portion 4*c* of the cutting element 4 is provided with said fields of perforations 8** for cutting short hair.

More particularly, said dog-eared holding flanges **4*a*, 4*b* at said transitional region where said at least one row of comb-like cutting teeth 6, 7 is formed, may be provided with a step-like concave depression 4*d* forming thinned-out tooth tips of said comb-like cutting teeth 6, 7, cf. FIGS. 4*a* and 4*b*. Due to such step-like concave depression, the cutting teeth 6, 7 become sufficiently thin to go under hair lying parallel onto the skin and to get even short stubbles hooked and engaged with the cutting edges of the teeth 6, 7, whereas on the other hand the dog-eared holding flange 4*a*, 4*b*, with a portion further away from the tooth tips, provides for sufficient distance from the center section 4*c* of the C-shaped cutter element 4 to be able to accommodate other elements or portions of the cutter system 3 such as frame portions 12 holding the dog-eared flanges 4*a*, 4*b***.

Despite such step-like, depressed contour **4*d* of the dog-eared holding flanges 4*a*, 4*b*, the C-shaped cutting element may have a continuously convex or dome-shaped or flat frontside defining a skin contact surface and/or skin facing surface 50 allowing for continuous skin engagement of other hair cutting structures such as shearfoil-like perforations 8 which may be arranged in said center section 4*c* of the C-shaped cutter element 4**.

More particularly, said front side of the center section **4*c* of the C-shaped cutting element 4 defining the skin contacting/facing surface 50 may extend continuously dome-shaped or continuously flat to the tooth tips of said comb-like cutting teeth 6, 7**.

When viewing the aforementioned C-shaped cutter element in cross section, cf. FIG. **4*a* and FIG. 4*b*, the thinned out tooth tips, due to such concave depression 4*d*, may be formed substantially U-shaped and/or may include neighboring portions of said holding flange 4*a*, 4*b* and said center section 4*c* which are folded back-to-back onto each other to form, in cross section of the C-shaped cutter element 4**, U-shaped tooth tips.

As shown by FIGS. **4*a* and 4*b*, the aforementioned transitional region between the dog-eared holding flanges 4*a*, 4*b* and the dome-shaped or flat center section 4*c* of the cutting element 4, may be curved by at least 165° or 175° in cross section. More particularly, at the tooth tips and/or at the teeth 6, 7, the dog-eared holding flanges 4*a*, 4*b* may be pressed onto the backside of the center section 4***c* so that the material forming the C-shaped cutting element 4 is sort of doubled in the region of the teeth 6, 7. Consequently, the thickness of the teeth becomes very small and does not significantly exceed an amount of twice the material thickness.

When viewing the cutting element 4 in cross section, said step-like concave depression 4*d* of the dog-eared holding flange 4*a*, 4*b* at the comb-like teeth 6, 7 may be arranged between two inflection points where, when viewed in cross section, the concave contour of the depression turns into convex and/or flat contours neighboring said concave depression. On the one side, the tooth tips may form a convex contour in terms of a curved portion with a very small radius of curvature or a tip portion defining a sort of protruding peak. On the other side, i.e. the end of the concave depression 4*d* opposite to the tooth tips, the concave contour may turn into a slightly convex or flat flange portion.

As can be seen from FIGS. 4*a* and 4*b*, the aforementioned step-like concave depression 4*d* may be smoothly curved in cross-section and/or may define a shallow chute-shape or trough-shape along the backside of the rake-like edge of the C-shaped cutting element 4.

Irrespective of such curved contour of the depression 4*d*, the aforementioned step-like concave depression 4*d* may be provided between frame portions 12 of the support structure 14 holding the dog-eared holding flanges 4*a*, 4*b* on the one hand and the tips of the comb-like cutting teeth 6, 7 on the other hand, and/or may be immediately adjacent to the tooth tips of the comb-like cutting teeth 6, 7. In other words, the holding flanges of the support structure may end on the dog-eared holding flanges before reaching the concave depression thereof, cf. FIGS. 4*a* and 4*b*.

Such arrangement of the concave depression 4*d* between the holding flanges 12 of the support structure 14 and the tooth tips allows to combine thinned-out cutting teeth 6, 7 with sufficient space for the support structure 14.

The thickness of the comb-like cutting teeth 6, 7, when viewed in a cross section of the C-shaped cutting element as shown by FIGS. 4*a* and 4*b*, may be less than 300% or less than 250% of the thickness of the material forming the center section and/or dog-eared flange of the cutting element. In FIGS. 4*a* and 4*b*, the thickness of the teeth 6, 6 is the vertical dimension thereof and corresponds to the height of the tooth tips. For example, when the C-shaped cutting element 4 is made from a sheet-like material having a sheet thickness of 0.15 mm, the teeth may have a thickness of less than 0.5 mm and/or ranging from 0.3 mm to 0.5 mm or 0.35 mm to 0.45 mm.

The C-shaped cutting element 4 may be made from a sheet material having a substantially constant thickness. For example, the dog-eared flanges 4*a*, 4*b* may have the same material thickness as the center section 4*c*.

When viewed in cross section, said tooth tips of the comb-like cutting teeth may have a radius of curvature of less than 0.25 mm.

For example, the C-shaped cutting element may be formed from a metal sheet, in particular from a spring steel sheet, wherein a spring steel having a tensile strength of more than 500 $N/mm^2$ or more than 750 $N/mm^2$ may be used.

As can be seen from FIG. 4, the outer cutting element 4, together with the outer frame 12 of the support structure 14, defines a chamber 17 which is surrounded by the outer cutting element 4 and the outer frame 12.

Within such chamber 17, the inner frame 11 for supporting the inner cutting element 5 is arranged. Said inner frame 11 includes at least one pair of support ribs 19 which extend from a base section 20 of the support structure 14 towards the inner cutting element 5 lying, back to back, onto the outer cutting element 4.

More particularly, as can be seen from FIG. 4, said support ribs 19 originate from a center section of the outer frame 12 where the diverging support legs of the outer frame 12 join each other. Said support ribs 19 of the inner frame 11 may extend from said base section 20 towards the inner cutting element 5 at an angle β which is considerably steeper than the angle tri between the outer frame 12. As can be seen from FIG. 4*a*, the support ribs 19 of the inner frame 11 may define an angle β from 2×20° to 2×40° or 2×25° to 2×30° between each other, wherein said support ribs 19 may be arranged symmetrical with regard to a center plane going perpendicular to the skin contact surface and parallel to the axis of reciprocation 10.

So as to give the support ribs 19 sufficient rigidity, said ribs 19 may have a straight longitudinal axis when viewed in a cross sectional view as it is shown in FIG. 4*a*. In other words, the inner and outer surfaces of the support ribs 19 may be plane and flat so as to achieve buckling stiffness. These support ribs 19 may define a V-shaped configuration originating from the base portion 20.

In the alternative, said ribs 19 may be configured flexible and/or elastically so as to bias inner the cutting element 5 onto the outer cutting element 4, as shown by FIG. 4*b*. For example, the ribs 19 may have a flexing, curved contour when viewed in cross-section, cf. FIG. 4*b*, so as to elastically urge the cutting element 5 against the other cutting element 4.

As can be seen from FIG. 5, the support ribs 19 may be part of a supporting insert and/or formed in one piece with each other. More particularly, the inner frame 11 may have a chute-like or trough-like configuration including a strip-like bottom portion from the edges of which said pair of support ribs 19 extends. For example, said inner frame 11 including the support ribs 19 may be formed from a substantially rectangular metal plate, wherein strip-like edge portions may be bent relative to a middle-section so as to form the inclined support ribs 19.

Said inner frame 11 may form an insert that can be inserted into the chamber 17 defined by the outer frame 12 and the outer cutting element 4. More particularly, said insert forming the inner frame 11 may be seated onto the base portion 20 of the outer frame 12 which base section 20 takes up the forces and pressure induced into the inner frame 11 when the cutter system 3 is pressed against skin to be shaved.

The inner frame 11 is configured such that the aforementioned gap 16 is defined between the support edges of the support ribs 19 on the one hand and the inner side of the outer cutting element 4 on the other hand. More particularly, the height of the support ribs 19 is configured such that said gap 16 between the support edges of the ribs 19 and the outer cutting element 4 substantially corresponds to the thickness of the inner cutting element 5, wherein the gap 16 may be configured to be slightly wider than the thickness of the plate-like cutting element 5 so as to reduce friction and to provide some play between the inner cutting element 5 and the support ribs 19 and the inner cutting element 5 and the outer cutting element 4. Such play may be given when the cutter system 3 is unloaded, i.e. not pressed against a skin to be shaved. In the operational state, when the outer cutting element 4 is pressed against the skin to be shaved, such play is eliminated and the cutting elements 4 and 5 are snuggly fitted onto each other to achieve smooth cutting of hair.

Despite such possible play provided by the support structure 14, the support ribs 19 are configured such that the gap 16, in its width, exceeds the thickness of the inner cutting element 4 by an amount which is smaller than the thickness of hair to be cut. For example, the width of the gap 16 may be larger than the thickness of the sandwiched cutting element 5 by an amount smaller than 40 μm or ranging from 20 μm to 40 μm.

In the alternative, when the ribs 19 are flexible as shown by FIG. 4*b*, the defined gap 16 may be zero or at least smaller than the thickness of the cutting blade 5 so as to achieve biasing.

As can be seen from FIG. 4, the inner and outer cutting elements 4 and 5 may have a slightly convex contour. More particularly, the skin contact surface defined by the outer cutting element 4 may have a slightly convex, substantially chute-like configuration. When viewed in a cross section taken perpendicular to the axis of reciprocation 10, the outer surface of the outer cutting element 4 may be slightly dome-shaped, cf. FIG. 4.

The inner cutting element 5 substantially corresponds to the shape of the outer cutting element 4 in terms of said slightly convex chute-like shape.

As can be seen from FIG. 4, the support edges of the support ribs 19 facing the inner cutting element 5 may be spaced from each other at a distance ranging from about 35% to 70% or 40% to 60% of the distance defined between the rows of comb-like teeth 6 and 7 at the opposite edges of the outer cutting element 4. Thus, the rigid support ribs 19 may support the inner cutting element 4 at about ⅓ and about ⅔ of its span width, when viewed in a cross section perpendicular to the axis of reciprocation 10. More particularly, the support edges of the ribs 19 may extend directly adjacent to the outer boundaries of the field of perforations 8, wherein said support ribs 19 may contact the inner cutting element 5 along the outer longitudinal contour of the cutouts forming the perforations 9 in the inner cutter element 5.

Due to the configuration of the support ribs 19 extending from the base portion 20 of the support structure 14 at an angle steeper than the support legs of the outer frame 12, the chamber 17 defined by the outer frame 12 and the outer cutting element 4 attached thereto, is divided by said support ribs 19 into an inner subchamber 17*i* and a pair of outer subchambers 17*o*, cf. FIG. 4, wherein the outer subchambers 17*o* together may have a volume substantially corresponding to the volume of the inner subchamber 17*i*.

The rigid support ribs 19 of the inner frame 11 may extend substantially parallel to the axis of reciprocation 10. More particularly, the support edges of the ribs 19 contacting the inner cutting element 5 may extend parallel to the axis of reciprocation 10.

Figure 6:
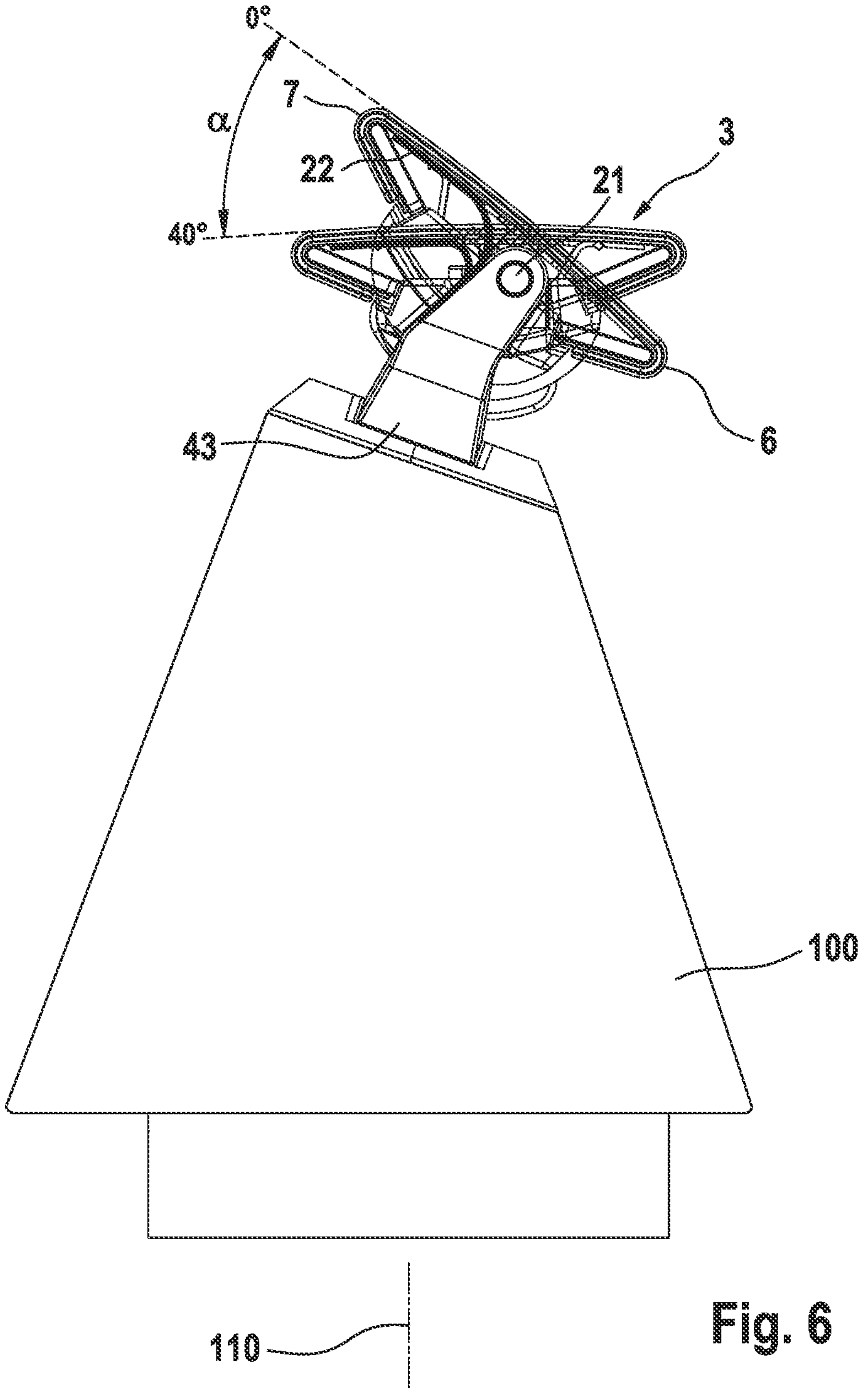
FIG. 6: a side view showing the pivoting of the cutter system relative to the handle of the shaver/trimmer as allowed by the support structure.
Figure 7:
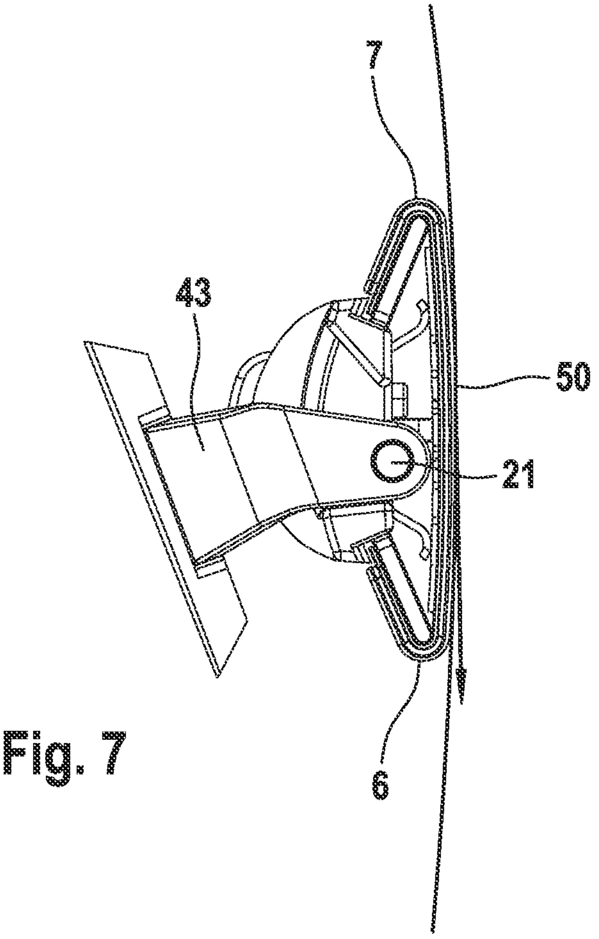
FIG. 7: a side view showing the cutter system pivoting about its pivot axis when following the skin contour.

As can be seen from FIGS. 6 and 7, the cutter head 2 including the cutter system 3 may be pivotably supported relative to the handle of the shaver/trimmer 1 about a pivot axis 21 which may extend substantially parallel to the axis of reciprocation 10. Said pivot axis 21 may be positioned close to the cutting elements 4 and 5 and/or within the chamber 17 surrounded by the outer cutting element 4 and the outer frame 12.

As can be seen from FIGS. 5 and 6, the outer frame 12 of the support structure 14 holding the outer cutting element 4 may include a pair of pivot bearing sections 12*a* and 12*b* which may be spaced from each other and/or positioned at the opposite end faces of the outer frame 12. On the other hand, a pair of support flanges 110 may be provided at the cutter head side of the handle 100, wherein said pivot bearing flanges 110 may be rotatably connected to said pivot bearing sections 12*a* and 12*b* of the outer frame 12 to form the pivot axis 21.

A spring device 22 may be associated with said pivot axis 21 so as to urge the cutter head 2 in a desired, mutual pivot position or orientation which may be a middle orientation allowing pivoting into opposite directions or, in the alternative, an end position or end orientation allowing pivoting into one direction only.

Said spring device 22 may be engaged with the support flanges 110 of the handle 100 on the one hand and the outer frame 12 on the other hand.

So as to drive the cutting elements 4 and 5 in a reciprocating manner relative to each other, a driver 18 may be connected to the inner cutting element 5, wherein such driver 18 may include a rod-like driving element attached to opposite end portions of the inner cutting element 5. On the other hand, said driver 18 may include a coupling section 18*c* to be coupled with a driving element extending from handle 100 to the cutter head 2. More particularly, the inner frame 11 and the outer frame 12 of the support structure 14 may include an elongated recess 23 or cutout extending through the base section 20 of the support structure 14, wherein the aforementioned coupling section 18*c* of driver 18 may extend through said elongated cutout 23, cf. FIG. 5 and FIG. 4, to allow coupling with the driving element of the drive train coming from the motor in the handle 100.

Said driver 18 may be slidably guided at the inner frame 11 and/or outer frame 12. For example, one or more guiding blocks 24 or bearings 24 may be provided at the outer frame 12. For example, such guiding blocks 24 may be inserted into the central, elongated recess 24 extending in the base portion of the outer frame 12, wherein said guiding blocks 24 may include slot-like groves 25, in which the rod-like driver 18 may be slidably guided.

Said driver 18 may be accommodated between said rigid support ribs 19 of the inner frame 11. In particular, said driver 18 may be accommodated within the inner subchamber 17*i* and thus, may be surrounded by the chute-like insert forming the inner frame 11 including the rigid support ribs 19, wherein the coupling section 18*c* of the driver 18 may extend through the central, elongated recess 23 in the bottom portion of said insert forming the inner frame 11.

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 mm" is intended to mean "about 40 mm."

Every document cited herein, including any cross referenced or related patent or application and any patent application or patent to which this application claims priority or benefit thereof, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A cutter system for an electric shaver and/or trimmer, comprising a pair of cooperating cutting elements, wherein said cutting elements are supported relative to each other by a support structure, wherein at least one of said cutting elements comprises at least one row of comb-like cutting teeth, a pair of dog-eared holding flanges attached to said support structure and a dome-shaped or flat center section, said at least one row of comb-like cutting teeth being formed in a transitional section between at least one of said dog-eared holding flanges and said center section, characterized in that said at least one of said dog-eared holding flanges, at said transitional section, is provided with a step-like concave depression forming thinned-out tooth tips of said comb-like cutting teeth, wherein said step-like concave depression is provided between a corresponding frame portion of said support structure attached to said at least one of said dog-eared holding flanges and the thinned-out tooth tips of said comb-like cutting teeth and immediately adjacent to the thinned-out tooth tips of said comb-like cutting teeth.

2. The cutter system according to claim 1, wherein said thinned-out tooth tips are formed, in cross section, U-shaped and/or include neighboring portions of said at least one of said dog-eared holding flanges and said center section.

3. The cutter system according to claim 1, wherein said transitional section is curved by at least 165° in cross section.

4. The cutter system according to a claim 1, wherein said step-like concave depression is facing away from a skin contact surface of said center section of said at least one of said cutting elements.

5. The cutter system according to claim 1, wherein the comb-like cutting teeth, at least at the thinned-out tooth tips, have a thickness, when viewed in cross section, of less than 300% of a thickness of a sheet material from which said at least one of said cutting elements is formed.

6. The cutter system according to claim 1, wherein the comb-like cutting teeth, at least at the thinned-out tooth tips, have a thickness, when viewed in cross section, of less than 1 mm.

7. The cutter system according to claim 1, wherein the thinned-out tooth tips of said comb-like cutting teeth have a radius of curvature of less than 0.25 mm.

8. The cutter system according to claim 1, wherein said at least one of said cutting elements is formed from a metal sheet made of spring steel having a tensile strength of more than 500 N/mm2.

9. The cutter system according to claim 1, wherein the other of said cutting elements extends into a gap between said dog-eared holding flanges and said center section of said at least one of said cutting elements and/or into a gap between said center section and said concave depression.

10. The cutter system according to claim 1, wherein said center section comprises one or more perforations, said support structure includes support ribs extending from a base portion of the support structure and forming support edges supporting the other of the cutting elements at a section positioned between said one or more perforations and said concave depression of said at least one of said dog-eared holding flanges of said at least one of said cutting elements.

11. The cutter system according to claim 1, wherein said at least one row of comb-like cutting teeth of said at least one of said cutting elements comprises rows of comb-like cutting teeth at opposite edges of said at least one of said cutting elements, said support structure includes support ribs extending from a base portion of the support structure and forming support edges supporting the other of the cutting elements, wherein the support edges of said support ribs facing the other of the cutting elements are spaced from each other at a distance ranging from 35% to 70% of the distance defined between the rows of comb-like teeth at said opposite edges of said at least one of said cutting elements.

12. The cutter system according to claim 11 wherein the support edges are spaced from each other at a distance ranging from 40% to 60% of the distance defined between the rows of comb-like teeth at said opposite edges of said at least one of said cutting elements.

13. An electric shaver and/or trimmer, comprising a cutter system which is configured in accordance with claim 1.

14. A cutter system for an electric shaver and/or trimmer, comprising a pair of cooperating cutting elements, wherein said cutting elements are movably supported relative to each other by a support structure, wherein at least one of said cutting elements comprises at least one row of comb-like cutting teeth, and when viewed in cross section, has a C-shape including a pair of dog-eared holding flanges attached to said support structure and a dome-shaped or flat center section, said at least one row of comb-like cutting teeth being formed in a transitional section between one of said pair of dog-eared holding flanges and said center section, characterized in that said one of said pair of dog-eared holding flanges, at said transitional section, is provided with a step-like concave depression forming thinned-out tooth tips of said comb-like cutting teeth, wherein said step-like concave depression is facing away from a skin contact surface of said center section of said at least one of said cutting elements.

15. A cutter system for an electric shaver and/or trimmer, comprising a pair of cooperating cutting elements, wherein said cutting elements are movably supported relative to each other by a support structure, wherein at least one of said cutting elements comprises rows of comb-like cutting teeth, and when viewed in cross section, has a C-shape including a pair of dog-eared holding flanges attached to said support structure and a dome-shaped or flat center section, one of said rows of comb-like cutting teeth being formed in a transitional section between a corresponding one of said pair of dog-eared holding flanges and said center section, characterized in that said one of said pair of dog-eared holding flanges, at said transitional section, is provided with a step-like concave depression forming thinned-out tooth tips of said comb-like cutting teeth, wherein said support structure includes support ribs extending from a base portion of the support structure and forming support edges supporting the other of the cutting elements, wherein the support edges of said support ribs facing the other of the cutting elements are spaced from each other at a distance ranging from 35% to 70% of the distance defined between the rows of comb-like teeth at opposite edges of said at least one of said cutting elements.

16. The cutter system according to claim 15 wherein the support edges are spaced from each other at a distance ranging from 40% to 60% of the distance defined between the rows of comb-like teeth at said opposite edges of said at least one of said cutting elements.

* * * * *